Dec. 5, 1967  G. H. FRIELING, JR  3,355,796
MANUFACTURE OF CLAD RODS, WIRES AND THE LIKE
Filed May 26, 1965  2 Sheets-Sheet 1
FIG.1.
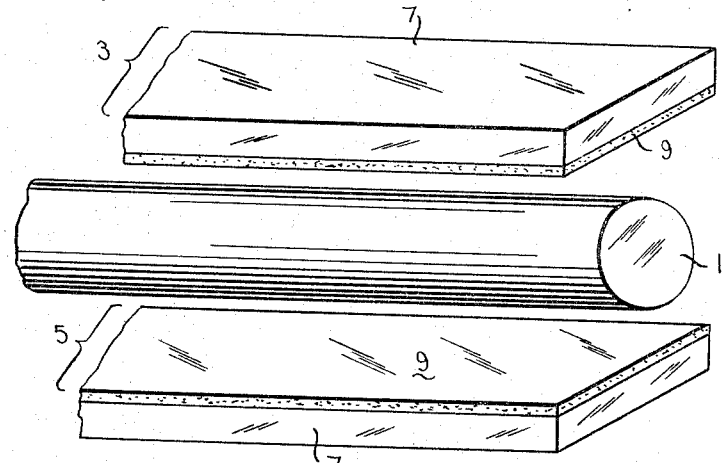
FIG.3.
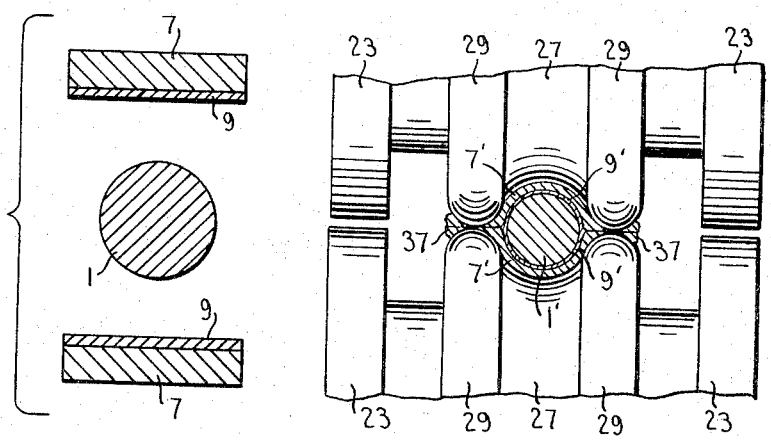
FIG.4.
Gerald H. Frieling, Jr.,
Inventor.
Koenig, Senniger, Powers and Leavitt,
Attorneys.

Dec. 5, 1967  G. H. FRIELING, JR  3,355,796
MANUFACTURE OF CLAD RODS, WIRES AND THE LIKE
Filed May 26, 1965  2 Sheets-Sheet 2
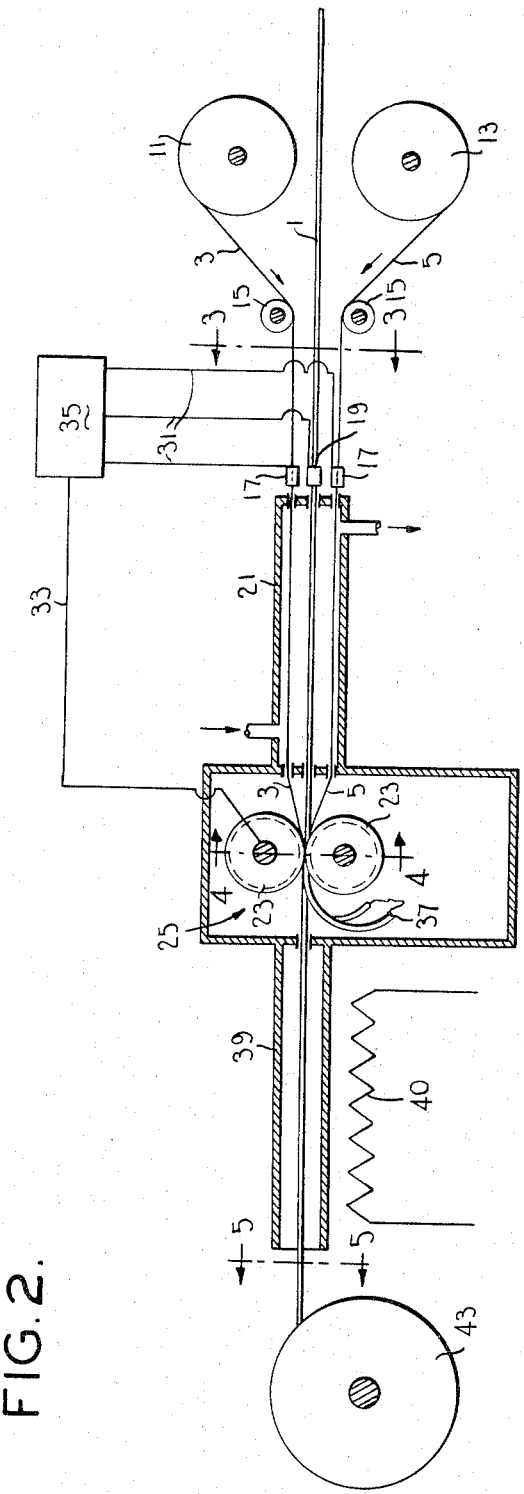
FIG. 2.
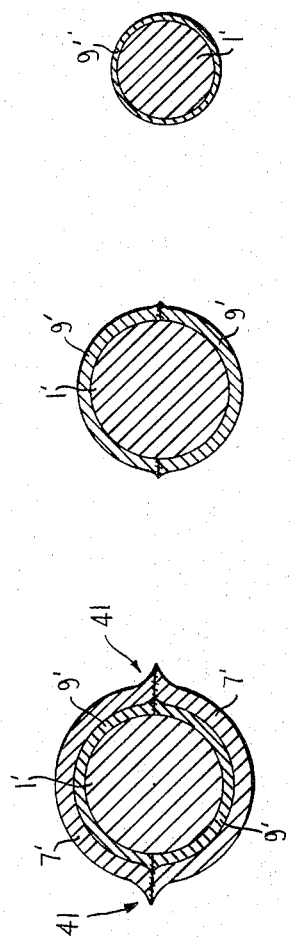
FIG. 7.
FIG. 6.
FIG. 5.

United States Patent Office 3,355,796
Patented Dec. 5, 1967

3,355,796
MANUFACTURE OF CLAD RODS, WIRES
AND THE LIKE
Gerald H. Frieling, Jr., Barrington, R.I., assignor to Texas Instruments Incorporated, Dallas, Tex., a corporation of Delaware
Filed May 26, 1965, Ser. No. 458,912
6 Claims. (Cl. 29—528)

ABSTRACT OF THE DISCLOSURE

Base metal wires, rods and the like are clad with a precious metal by feeding a core comprising a clean length of the base metal between two strips, each of the latter comprising a base metal layer and a clean soft precious metal layer. The precious metal layers face the core material and are bonded thereto by running the core and strips through forming squeeze rolls to solid-phase green-bond the precious metal to and around the core metal and to solid-phase bond transverse strips of the precious metal layers between themselves along strips adjacent to the core. The core with its jacket is sintered to effect growth of the green bonds to increase the bond strength, and then it is immersed in a pickling bath to remove the exposed base metal of the strips from the outer surface of the precious metal. The clad core is then reduced to the desired size.

---

This invention relates to the manufacture of clad rods, wires and the like, and to clad products in the stated category having base-metal cores and claddings of soft precious metal.

Among the several objects of the invention may be noted the provision of a method for producing improved clad rod, wire and the like, wherein the cladding is on base metal and is in the form of a uniform thin precious-metal inlay which is nonporous; and the provision of a method of the class described which results in a significant lower manufacturing cost. Other objects and features will be in part apparent and in part pointed out hereinafter.

The invention accordingly comprises the substances and combinations of substances, the proportions thereof, steps and sequence of steps, and features of composition and manipulation which will be exemplified in the products and methods hereinafter described, and the scope of the application of which will be indicated in the following claims.

In the accompanying drawings, which illustrate several modifications of the invention, FIG. 1 is a perspective view illustrating certain starting materials;

FIG. 2 is a diagrammatic view illustrating the process;
FIG. 3 is a cross section taken on line 3—3 of FIG. 2;
FIG. 4 is a cross section taken on line 4—4 of FIG. 2;
FIG. 5 is a cross section taken on line 5—5 of FIG. 2;
FIG. 6 is a cross section of a partly finished product; and FIG. 7 is a view similar to FIG. 6, showing a finished product.

Corresponding reference characters indicate corresponding parts throughout the several views of the drawings.

It has formerly been the practice, when desired to clad base-metal rods, wires and the like with a thin layer of precious metal, to employ electroplating. This has not been entirely satisfactory. There are various reasons for cladding a base-metal core with a precious metal. Among these is to provide a highly conductive surface and at the same time to protect the core against corrosion from such corrosive liquids and atmospheres as might otherwise reach the base metal. While thin electroplating of precious metals provides for good surface conductivity, it does not provide reliable protection against corrosion because of porosity. Therefore, among other things I clad a base metal by bonding thereto the precious-metal cladding, as for example a solid-phase bonding process such as set forth in United States Patent 2,753,623. Such a process is capable of bonding very thin layers, called inlays, of precious metal on comparatively thick base-metal strips. However, when the base metal is in a form other than flat, as shown in Patent 2,753,623, i.e., a rod or tube, it becomes more difficult directly to solid-phase bond thereto a uniform inlay of thin precious metal. By means of the process of the present invention, a uniform inlay of precious metal may be obtained on other than flat base-metal core material to form a nonporous protective cladding thereon.

Hereinafter the term base metal means any metal or alloy which is to be protected against corrosion, such as iron, steel, nickel, copper, or their alloys, et cetera. The term precious metal means gold, silver, platinum or their alloys, et cetera, which do not corrode in normal use. The term core means that which is clad and may be in the form of a rod, wire or tube of any appropriate cross section. While the shapes and dimensions hereinafter given are illustrative, they are not to be taken as limiting. All drawings are illustrative and not to scale because of the small dimensions involved.

Referring now more particularly to FIG. 1, there is shown at numeral 1 a cylindrical base-metal core which is to be clad with a precious metal. Its diameter is not critical and may range between what is called wire to what is called rod. Its starting diameter may be a substantial fraction of an inch, such as, for example, ⅛ inch. As will appear, its finished diameter becomes much smaller, as for example, .020 inch.

At numerals 3 and 5 are shown two composite strips, each of which is composed of a base-metal backing strip 7, the starting thickness of which may be on the order of 1/64 inch to 1/32 inch, although this is not limiting. Previously bonded to each base-metal backing strip 7 is a thin precious-metal layer 9, the starting thickness of which may be on the order of one or a few thousandths of an inch or so. The bonding has preferably been accomplished in the solid phase under pressure, as set forth for example in said patent.

Referring to FIG. 2, numerals 11 and 13 show coils of the composite strips 3 and 5, respectively. These are shown by single lines because of the small scale. The coils 11, 13 and guide rolls 15 are arranged to guide the strips 3 and 5 along parallel paths, between which is located the base-metal core material 1 (see also FIG. 1). The precious-metal layers 9 face the core 1. The strips 3 and 5 are directed to slide through electrical contacts 17, and the core material 1 through an electrical contact 19. All of them then proceed through a retort 21 in which is circulated a reducing atmosphere of disassociated ammonia, for example, to inhibit oxidation. The retort 21 is not always necessary. The lengths 1, 3 and 5, before entering the retort 21, have been adequately cleaned by removal of gross contaminants and oxides in the usual way, as taught by said patent, for example.

From the retort 21 or its equivalent (if required), the core 1 and strips 3 and 5 converge to a bite between squeezing rolls 23 of a rolling mill 25. This sandwiches the core 1 between the composite strips 3 and 5. A typical cross section in the bite between rolls is shown in FIG. 4. Grooves 27 in the rolls, flanked by lands 29, are arranged to squeeze the composite strips around the core 1 with considerable radial reduction. This produces solid-phase green bonds between the precious metal 9 and the core 1, and also between lateral stripes of the precious metal itself. At the same time the lands 29 may pinch off waste material 37, or so nearly is this pinched off that subsequent removal is easily performed by bending, skiving or the like. Complete pinch-off is illustrated. If desired, the core 1 and the composite strips 3 and 5 may be differentially heated through circuitry 31, 33 under control of an electrical control system 35. The portion 33 of the circuit is closed through the axle of one of the rolls 23. However, such differential heating is not always required.

As above indicated, the bond effected between rolls 23 is a so-called green bond. This is improved by heating to effect sintering and may be accomplished in a retort 39. A heater is illustrated at 40. The resulting intermediate product is such as shown enlarged in FIG. 5. This illustrates conditions after reduction and bonding effected between the rols 23. Thus there results the reduced core 1' around which is the solid-phase bonded jacket composed of the reduced thin inner layer 9' of precious metal and outside reduced thicker layer 7' of a base metal. As shown in FIG. 5, there is a flashing effect formed at the pinch regions, as shown at 41. From the retort 39 the partially finished product such as shown in FIG. 5 may or may not be wound up on a coil 43.

In any event, the composite semifinished material such as shown in FIG. 5 is passed through a conventional acid pickling bath. This attacks the base-metal exterior 7' and removes it, with the result shown in FIG. 6, which shows a very thin nonporous cladding 9' of precious metal around the core 1'. The pickling bath apparatus is not illustrated, being conventional and known to those skilled in the art. The cladding 9' is at this stage quite thin, due to the reducing action accomplished between the rolls 23.

In FIG. 7 is shown the finished product which, by conventional drawing through a suitable die, has had its diameter further reduced and the flashing or fin 41 thereby also eliminated. For a finished wire core drawn to, say, .020 inch in diameter, the nonporous precious-metal cladding may be on the order of only 50 to 100 millionths of an inch thick. An electroplated cladding as thin as this would be porous in many cases.

While the invention has been described in connection with what may be referred to as wire, it will be seen that it could be carried out to produce clad products of larger diameters which might be called rods. Moreover, the core 1', instead of being solid, may itself be in the form of a tube. It will also be understood that, if desired, the invention may be carried out with other than a circular cross section of the core. As regards the waste material at 37, it may if desired be allowed to pass through the pickling bath to remove its base-metal component and thereafter remove any waste left, before final drawing. It will also be understood that sintering to improve the solid-phase green bonds may be carried out after removal by pickling of the base-metal layer 7'.

In view of the above, it will be seen that by means of my process there is obtained clad wire, rod or the like which has a low-cost base-metal core carrying a very thin nonporous cladding of a precious metal. An example of the use of a material in wire form such as described is the production of conductive small plug-in pins for high-speed computers which carry switching current. The core material at low cost gives the pins a stiff characteristic and the thin nonporous inlay cladding of precious metal provides a good electrically conductive surface which is oxidation-resistant so as fully to protect the core against corrosion. Such pins can obviously be made by segmenting the finished wire or rod into appropriate pin-forming lengths. It may be remarked that the ends of the base-metal core material in the pins are not exposed to the atmosphere, being covered by the welding, soldering or the like employed for placing the pins in circuit.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

What is claimed is:

1. The method of producing clad wires, rods and the like, comprising feeding a length of clean base-metal core material between two lengths of composite bonded strips each of which comprises a base-metal layer and a clean soft precious-metal layer, said layers being bonded, the precious-metal layers being located adjacent the core material and in opposition to each other, feeding the core material and the composite strips thus arranged between roll squeezing means to solid-phase bond the precious metal to and around the periphery of the core material and to solid-phase bond the opposing transverse stripes of the precious-metal layers thereby to provide the core material with a jacket which by its precious-metal layer protects the base metal of the core but exposes the base metal of the jacket, and subjecting the jacket to a selective pickling to remove only its exposed base metal.

2. The method of producing clad wires, rods and the like, comprising feeding a length of clean base-metal core material between two lengths of clean composite strips each of which comprises a base-metal layer and a soft precious-metal layer, said layers being bonded, the precious-metal layers being located adjacent the core material and in opposition to each other, feeding the core material and the composite strips thus arranged between grooves and lands of roll squeezing means to solid-phase green bond the precious metal to and around the periphery of the core material and to solid-phase green bond the opposing transverse stripes of the precious-metal layers, thereby to provide the core material with a jacket which by its precious-metal layer protects the base metal of the core but exposes the base metal of the jacket, sintering the jacketed core material to improve the bond between it and the precious-metal layer and subjecting it to a selective pickling to remove only the exposed base metal of its jacket to produce a base-metal core clad with a nonporous precious metal.

3. The method according to claim 2, including the step of drawing the clad core to reduce its diameter and the thickness of its precious-metal cladding.

4. The method according to claim 1, wherein the base metal employed is selected from the group consisting of iron, steel, nickel, copper and their alloys and wherein said precious-metal layers employed are selected from the group consisting of gold, silver, platinum and their alloys.

5. The method according to claim 2, wherein the base metal employed is selected from the group consisting of iron, steel, nickel, copper and their alloys and wherein said precious-metal layers employed are selected from the group consisting of gold, silver, platinum and their alloys.

6. The method according to claim 3, wherein the base metal employed is selected from the group consisting of iron, steel, nickel, copper and their alloys and wherein said precious-metal layers employed are selected from the group consisting of gold, silver, platinum and their alloys.

(References on following page)

References Cited

UNITED STATES PATENTS

| | | |
|---|---|---|
| 962,985 | 6/1910 | Schutz. |
| 2,140,131 | 12/1938 | Heafrick. |
| 2,539,246 | 1/1951 | Hensel. |
| 2,697,954 | 12/1954 | Sowter. |
| 3,063,142 | 11/1962 | Kroon _____ 29—424 |
| 3,242,563 | 3/1966 | Turner _____ 29—424 X |
| 3,254,401 | 1/1966 | Dalton et al. _____ 29—424 X |

JOHN F. CAMPBELL, *Primary Examiner.*

P. M. COHEN, *Assistant Examiner.*